United States Patent
Salvador et al.

(10) Patent No.: US 6,432,568 B1
(45) Date of Patent: Aug. 13, 2002

(54) WATER MANAGEMENT SYSTEM FOR ELECTROCHEMICAL ENGINE

(75) Inventors: John P. Salvador, Rochester, NY (US); Rodney Lynn Borup, Los Alamos, NM (US); William Henry Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 118 days.

(21) Appl. No.: 09/632,184

(22) Filed: Aug. 3, 2000

(51) Int. Cl.[7] .................. H01M 8/04; B60L 11/18
(52) U.S. Cl. .................. 429/19; 429/24; 429/26; 429/34; 180/65.3
(58) Field of Search .................. 429/19, 20, 24, 429/26, 34; 180/65.3

(56) References Cited

U.S. PATENT DOCUMENTS

| | | | | |
|---|---|---|---|---|
| 4,037,024 A | * | 7/1977 | Landau ............... | 429/26 X |
| 4,769,297 A | * | 9/1988 | Reiser et al. ........ | 429/34 X |
| 5,837,393 A | * | 11/1998 | Okamoto ............ | 429/20 |
| 6,015,634 A | * | 1/2000 | Bonville et al. ..... | 429/19 X |
| 6,306,532 B1 | * | 10/2001 | Kurita et al. ........ | 429/20 |

FOREIGN PATENT DOCUMENTS

| | | | | |
|---|---|---|---|---|
| JP | 8-091804 | * | 4/1996 | H01M/8/04 |
| JP | 11-273705 | * | 10/1999 | H01M/8/04 |
| JP | 2000-149970 | * | 5/2000 | H01M/8/04 |
| JP | 2000-208158 | * | 7/2000 | H01M/8/04 |

* cited by examiner

*Primary Examiner*—Stephen Kalafut
(74) *Attorney, Agent, or Firm*—Laura C. Hargitt

(57) ABSTRACT

An electrochemical engine for a vehicle comprises a fuel processor operating to process liquid fuel to hydrogen gas reformate, a combustor to generate heat for the fuel processor, and a fuel cell stack to generate electricity from the hydrogen gas reformate and producing water vapor by-product. A water management system of the engine comprises a condenser to reclaim liquid water from the water vapor by-product and a water tank for storing the reclaimed water. A water pump circulates water from the water tank to the fuel processor. A drainage valve is operable to open to release water from the water tank to a freeze tank to avoid freezing water in the water tank.

13 Claims, 3 Drawing Sheets

WATER MANAGEMENT SYSTEM FOR ELECTROCHEMICAL ENGINE

TECHNICAL FIELD

The present invention relates to a water management system for an electrochemical engine in a vehicle.

BACKGROUND OF THE INVENTION

As electrochemical engines are being integrated into useable vehicles, developing efficient ways of operating it under varying environmental conditions becomes more critical. An electrochemical engine operates by inputting hydrogen gas and oxygen into a fuel cell stack to convert chemical energy into electricity, with water vapor and heat as the primary by-products. Where hydrogen is not stored on board a vehicle, a fuel processor may operate to partially oxidize liquid fuels such as gasoline, diesel, or methanol to produce hydrogen gas. To increase the overall fuel processor efficiency, the fuel processor may also operate as a steam reformer, as processing the fuel with water is inherently more efficient than processing the fuel with air only. Steam reformation releases more hydrogen from water molecules than partial oxidation. Generally, water for steam reformation may be recovered during engine operation, but water may not be available for engine start-up. Initiating engine start-up without water is inefficient, especially in hot environments. The fuel processor is also more difficult to control without water due to the operational window to avoid carbon formation.

To insure that the engine is provided with water for a majority of engine start-ups, water vapor by-product from the fuel cell stack may be cooled through a condenser to recapture liquid water and store it in a reservoir for future engine start-ups. Storing water on board creates the concern for freezing, which may damage associated water supply components such as sensors, valves, and pumps. If the fuel used is methanol for example, the freezing concern may be a non-issue, as water and methanol may be mixed to form a non-freezing mixture. This solution would not work with gasoline-type fuels, which do not naturally form a non-freezing homogeneous mixture with water. Water may be mixed with gasoline as a homogeneous mixture if a surfactant is used; unfortunately most surfactants may add cost and complexity to the fuel infrastructure and affect fuel processor performance.

An alternative solution to the issue of freezing reserved water is to release the water upon turning the vehicle engine off when the temperature approaches freezing. The drawback is that releasing water may cause a potential hazard of creating pools of ice in garages or other parking locations.

Another alternative may be the use of insulating techniques to maintain the water storage tank above freezing.

SUMMARY OF THE INVENTION

The present invention is directed to a water management system and a method for operating it in an electrochemical engine. The water management system includes a condenser to recover water from the fuel cell stack exhaust and a water tank to store the recovered water. The recovered water is pumped to the fuel processor upon engine start-up and during normal engine operation to improve engine efficiency. In the event that the temperature threatens to freeze the water in the water tank, a valve opens to release the water to a freeze tank where the water may safely freeze. Removing the water from the water tank minimizes the risk of freezing the associated water system components. A hot exhaust or coolant stream from the electrochemical engine may be passed about the freeze tank to slowly melt the frozen water. In addition or alternatively, the liquid melt may be slowly drained onto the road while the vehicle is in motion.

This water management system takes advantage of the significant efficiencies gained by having water readily available upon start-up of the engine for all temperatures greater than freezing. Although below freezing, the engine starts without water, the condenser is effective at such lower temperatures and quickly forms liquid water to supply to the fuel processor.

DESCRIPTION OF THE PREFERRED EMBODIMENT

Figure 1:
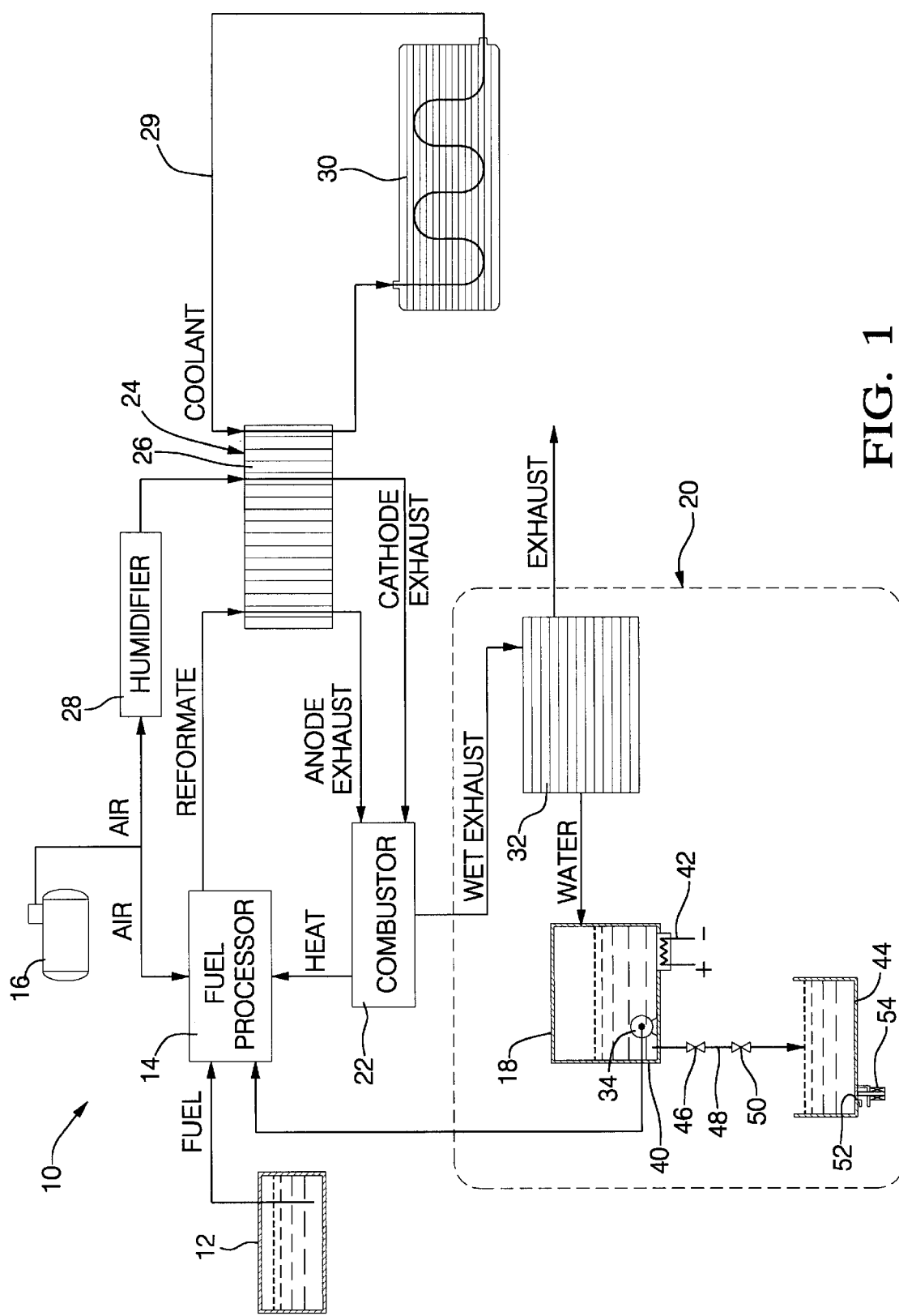
FIG. 1 is a schematic layout depicting an electrochemical engine embodying the present invention.

An electrochemical engine (ECE) operates to generate electricity in a fuel cell stack given hydrogen gas and oxygen. Hydrogen gas for the fuel cell stack may be produced on board the vehicle and this method is described with reference to FIG. 1.

A liquid fuel, such as gasoline, diesel, methanol, etc., is stored on board the vehicle in a fuel tank 12. The fuel is supplied to a fuel processor 14 in the ECE 10. The fuel processor 14 may also receive compressed air from an air compressor 16 for partial oxidation and water, if available, from a water tank 18 for steam reformation. A combustor 22 generates and supplies heat to the fuel processor 14, wherein the fuel processor partially oxidizes and reforms the fuel to produce a hydrogen-containing reformate. If water is available, the fuel processor 14 steam reforms a portion of the fuel to produce additional hydrogen. Having water present, also reduces the likelihood that methane and solid by-products such as soot and carbon, are created. To reduce residual carbon monoxide in the reformate, the fuel processor 14 may further include one or more carbon monoxide reduction reactors where the residual carbon monoxide is combined with water to produce carbon dioxide and hydrogen. The fuel processor 14 may further include a carbon monoxide cleanup reactor where the residual carbon monoxide is oxidized using air from the air compressor 16. The reformate may also be passed through a cooler, if cooling is necessary before the reformate is delivered to a fuel cell stack 24.

To generate electricity in the fuel cell stack 24, the hydrogen-containing reformate is delivered under pressure to the stack. The fuel cell stack 24 contains a series of individual bipolar fuel cell plates 26, as is known in the art. The hydrogen-containing gas is fed through an anode, not shown, to create positively charged hydrogen ions. Concurrently the air compressor 16 and an optional cathode humidifier 28 provide a humidified oxidant supply to a cathode, not shown, of the fuel cell plates 26. The cathode is separated from the anode by an electrolyte. If a humidifier 28 is used, it may receive water from the water tank 18. Electricity is generated in the fuel cell stack 24 by electrochemically processing the hydrogen and oxygen in a manner known in the art. The generated electricity may power a drive system and auxiliary vehicle devices.

The fuel cell stack 24 generates heat and exhaust gases, as by-products. To manage the heat, the ECE 10 includes a primary coolant circuit 29 to circulate low temperature engine coolant through the fuel cell stack 24, transferring waste heat out of the stack. The heated coolant is cooled through a heat exchanger 30 as is known in the art.

Depending on the initial liquid fuel, the fuel cell stack 24 may exhaust methane, unconsumed hydrogen, carbon dioxide, nitrogen, and water from the anode and unconsumed oxygen, nitrogen, and water from the cathode. The exhaust streams are routed through the combustor 22 for providing the dual function of consuming undesirable exhaust components and generating heat for the fuel processor 14. The wet exhaust stream flowing out of the combustor 22 may contain oxygen, nitrogen, carbon dioxide, and water, and is directed through a condenser 32 to reclaim liquid water and finally is exhausted from the vehicle. Alternatively, the exhaust stream from the fuel cell stack 24 may be first routed through the condenser 32 and then to the combustor 22 before exiting the vehicle.

The ECE 10 further includes a water management system 20 comprising the condenser 32 for recovering water from the wet engine exhaust, the water tank 18 for storing the recovered water, and a water pump 34 for pumping water from the tank 18 to the fuel processor 14. The recovered water is pumped to the fuel processor 14 upon ECE start-up and during normal ECE operation to improve the engine efficiency, as processing the fuel with water releases more hydrogen than processing the fuel with only air. Further, depending on the configuration of the fuel cell stack 24, water may also be used to humidify the input to the anode and/or cathode.

A means for trying to keep the water tank 18 above freezing to minimize the risk of potentially damaging the water pump 34 may be provided. One means is to provide insulation 40 about the water tank 18. A second means is to run a small resistive element 42 through the walls of the water tank 18 or to the water itself, where the small current may be drawn from a battery even when the ECE 10 is not operating.

In addition, if the means for maintaining the water tank above freezing become insufficient such as in the case of very cold temperatures or a fully discharged battery, the water management system 20 provides the capability to evacuate the stored water from the water tank 18 to a reserve tank referred to as a freeze tank 44. The freeze tank 44 and a drainage valve 46 operate as a fail-safe to prevent freezing of the water pump 34. The drainage valve 46 opens to release water from the water tank 18 through a drainage line 48 into the freeze tank 44 in the event that the temperature threatens to freeze the water in the water tank. A check valve 50 may be disposed in the drainage line 48 between the drainage valve 46 and the freeze tank 44. The water may be evacuated from the water tank 18 by gravity or by pumping it out, for example. Removing the water from the water tank 18 minimizes the risk of freezing the associated water pump 34. The freeze tank 44 is sized to accommodate all of the water possibly held in the water tank 18, without overflowing or bursting when it freezes.

The potential exists that ice may form at the drainage valve 46 before the water tank 18 is drained completely. This potential risk may be reduced by insulating the drainage line 48 and valve 46 or by running a low current through the valve body to keep it above freezing.

Figure 2:
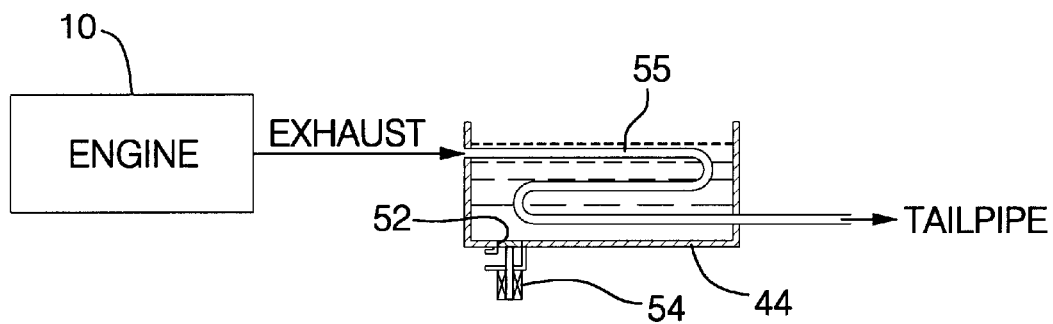
FIG. 2 is a schematic layout of a portion of the water management system and the engine.
Figure 3:
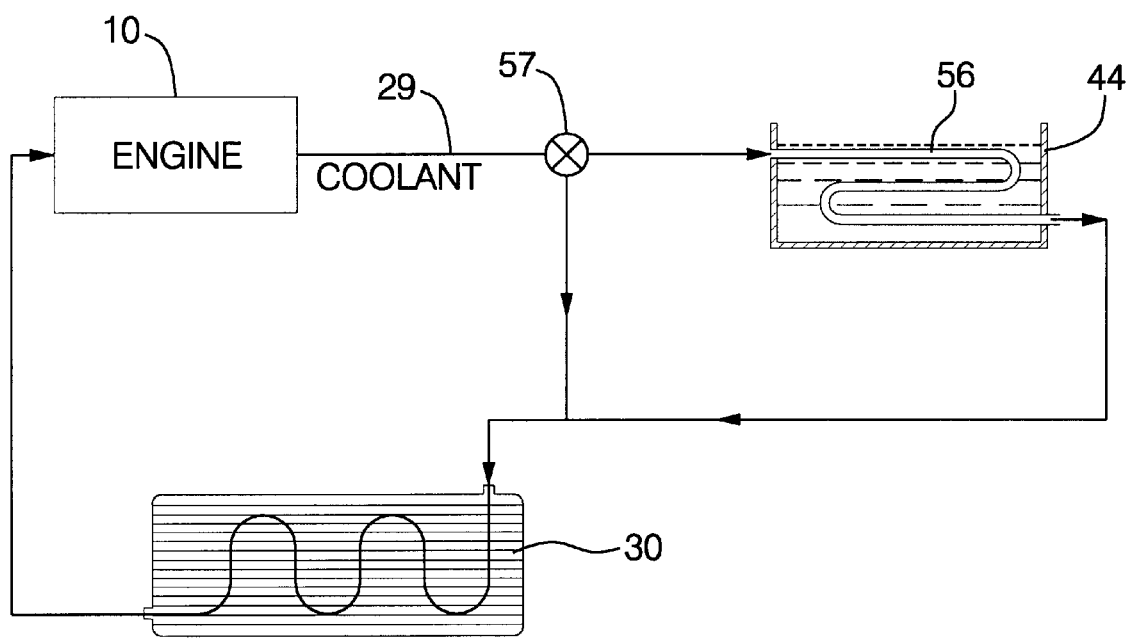
FIG. 3 is a second schematic layout of a portion of the water management system and the engine.

A thawing means for changing the ice held in the freeze tank 44 to liquid or vapor may be provided. One such thawing means is for an exhaust conduit 55 carrying engine exhaust and routed adjacent to the freeze tank or through the freeze tank 44, as shown in FIG. 2. If an open freeze tank 44 is employed, the engine exhaust stream may be passed directly over the open freeze tank to slowly melt the ice and evaporate it into the exhaust stream before exiting the vehicle. A second thawing means, shown in FIG. 3, involves routing heated engine coolant through a coolant conduit 56 provided through or adjacent to the freeze tank 44. The coolant conduit 56 branches off from the primary coolant circuit 29 where a coolant distribution valve 57 may be disposed between the fuel cell stack 24 and the heat exchanger 30. The coolant distribution valve 57 controls when coolant flows to the freeze tank 44, such as when there is ice accumulation in the tank.

In addition, the freeze tank 44 may include a purge valve 54, such as a solenoid valve, provided in a valve opening 52 in the freeze tank 44 such that liquid melt held in the freeze tank may be slowly released onto the ground when the purge valve is opened. The purge valve 54 may be controlled to open only if the ECE 10 is operating and the vehicle is moving. This would avoid the concern of draining a substantial quantity of water onto a garage floor or other surface.

The method for operating the water management system 20 of the present invention is now described. The overall objective is to keep water readily available in the water management system 20 for efficient start-up and operation of the ECE 10, without allowing it to freeze. The drainage valve 46 may be temperature-actuated for opening, whereby if a monitored temperature sensor, not shown, falls below a critical temperature, the drainage valve opens. The monitored temperature may be outside air temperature where the critical temperature may be below 0° C. or the temperature in the water tank 18 where the critical temperature may be slightly above 0° C. The drainage valve 46 releases water from the slightly pressurized water tank 18 to the freeze tank 44 via the drainage line 48. The drainage valve 46 may be closed by several means. For example, the drainage valve 46 may close once a water level sensor indicates the water tank 18 is empty, or once the pressure in the water tank falls and stabilizes at atmospheric pressure. It is important that the drainage valve 46 is operable even when the ECE 10 is turned off. This allows the drainage of the water tank 18 to occur even if the vehicle is allowed to stand, non-operated, for several days.

Figure 4:
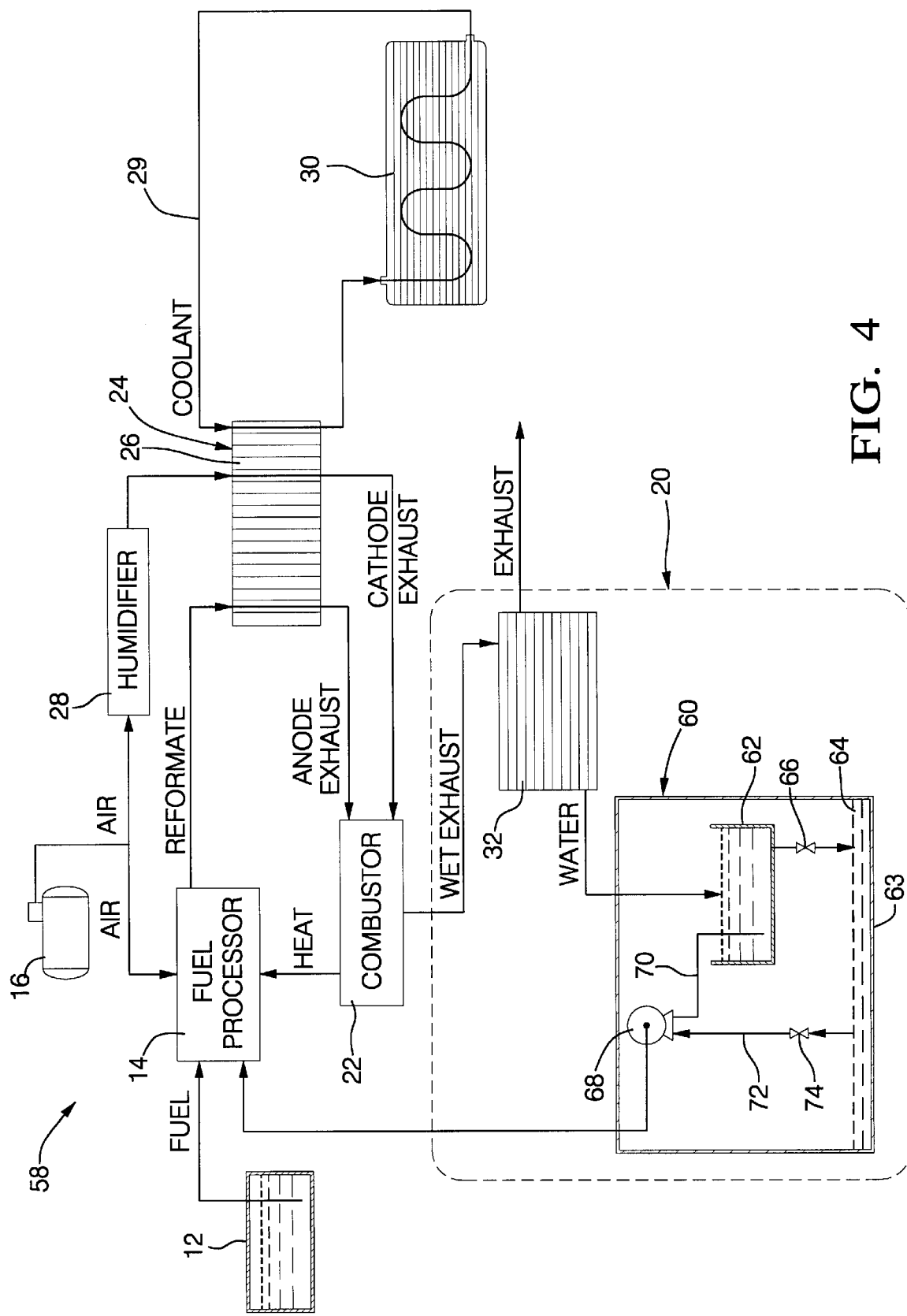
FIG. 4 is a schematic layout depicting a second embodiment of the present invention.

FIG. 4 demonstrates an ECE 58, having an integrated water tank 60, which provides the additional functionality of recycling and re-circulating previously frozen water back into the ECE. Like components to FIG. 1 are designated with the same numerals. In this instance, the water management system 20 comprises the condenser 32 for recovering water from wet engine exhaust, an integrated water tank 60 for storing the recovered water, and a water pump 68 for pumping the water from water tank to the fuel processor 14. The integrated water tank 60 has an upper reservoir tray 62 for receiving and holding condensed water from the fuel cell stack exhaust gas. The upper tray 62 may drain to the bottom 63 of the integrated water tank 60, which defines a lower, freeze reservoir, via a drainage valve 66. The water pump 68 is in fluid communication with the upper tray 62 by a first water line 70 and with the lower, freeze reservoir 64 by a second water line 72. The second water line 72 may include a control valve 74 to control flow from the lower, freeze reservoir 64 to the water pump 68.

Similar means for thawing the ice held in the lower, freeze reservoir 64 may be employed as discussed in the first embodiment. For instance, an exhaust conduit carrying engine exhaust gas may be routed by or through the integrated water tank 60, a coolant conduit carrying fuel cell stack-heated coolant may be routed by or through the tank, or a small resistive element may be used to warm the lower, freeze reservoir 64.

During ECE operation, water recovered from the exhaust gas is collected in the upper tray 62 of the integrated water tank 60. The drainage valve 66 may be temperature-actuated for opening, whereby if the monitored temperature sensor falls below a critical temperature, the drainage valve opens as discussed in the previous embodiment. The drainage valve 66 releases water from the upper tray 62 to the bottom 63 of the integrated water tank 60 to collect and freeze in the lower, freeze reservoir 64. The drainage valve 66 is closed when all the water is drained. Upon ECE start-up and operation, the water pump 68 may be capable of drawing from both the first and second water lines 70, 72 to deliver water. Alternatively, the water pump 68 defaults to drawing water from the upper tray 62 through the first water line 70. If the control valve 74 is open, then the water pump 68 draws water from the lower, freeze reservoir 64 through the second water line 72. The control valve 74 is opened when ice held in the lower, freeze reservoir 64 has melted as indicated by a temperature sensor for example. This integrated water tank configuration allows the water, drained from the upper tray 62 upon the threat of freezing, to later be re-circulated through the fuel processor 14.

The water management system of the present invention provides a means for reclaiming water exhausted in the electrochemical process, which may be re-circulated to the fuel processor to improve efficiency. To insure that the water system's pump and valves are not harmed by freezing stored water, the water management system provides a means for evacuating the water storage tank to a second reserve where the water may safely freeze. Frozen water in this second reserve may be melted by waste heat from the electrochemical process and the liquid water re-circulated to the fuel processor.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An electrochemical engine for a vehicle, comprising: a fuel processor operating to process liquid fuel to hydrogen gas reformate, a fuel cell stack to generate electricity from said hydrogen gas reformate and producing water vapor by-product, and a water management system comprising a condenser to reclaim liquid water from said water vapor by-product, a water tank for storing said reclaimed water, a water pump to circulate water from said water tank to said fuel processor, a freeze tank, and a drainage valve operable to open to release water from said water tank to said freeze tank to avoid freezing water in said water tank.

2. An electrochemical engine for a vehicle, as defined in claim 1, further comprising an exhaust conduit carrying anode gas exhaust and routed to flow through or about said freeze tank to melt any ice therein.

3. An electrochemical engine for a vehicle, as defined in claim 1, further comprising a coolant conduit carrying fuel cell stack-heated coolant and routed to flow through or about said freeze tank to melt any ice therein.

4. An electrochemical engine for a vehicle, as defined in claim 1, wherein said freeze tank further includes a purge valve operable to open to release melted ice from said freeze tank.

5. An electrochemical engine for a vehicle, as defined in claim 4, wherein said electrochemical engine is installed in a vehicle and said purge valve is only operable to open when said engine is operating and said vehicle is in motion.

6. An electrochemical engine for a vehicle, as defined in claim 1, further comprising a means for maintaining said water tank above freezing temperature.

7. An electrochemical engine for a vehicle, as defined in claim 6, wherein said means for maintaining said water tank above freezing temperature includes insulation about said water tank.

8. An electrochemical engine for a vehicle, as defined in claim 7, wherein said means for maintaining said water tank above freezing temperature further includes a resistive element about said water tank.

9. An electrochemical engine for a vehicle, comprising: a fuel processor operating to process liquid fuel to hydrogen gas reformate, a fuel cell stack to generate electricity from said hydrogen gas reformate and producing water vapor by-product, and a water management system comprising a condenser to reclaim liquid water from said water vapor by-product, and an integrated water tank comprising an upper tray for receiving and storing condensed water from said condenser, a lower, freeze reservoir defined by the bottom of said integrated water tank, a drainage valve operable to release water from said upper tray to said lower, freeze reservoir to avoid freezing water in said upper tray, and a water pump in fluid communication with said upper tray by a first water line and with said lower, freeze reservoir by a second water line, to circulate water to said fuel processor.

10. An electrochemical engine for a vehicle, as defined in claim 9, wherein said second water line includes a control valve operable to allow said water pump to draw melted ice from said lower, freeze reservoir.

11. An electrochemical engine for a vehicle, as defined in claim 9, further comprising an exhaust conduit carrying anode gas exhaust and routed to flow through or about said integrated water tank to melt any ice therein.

12. An electrochemical engine for a vehicle, as defined in claim 9, further comprising a primary coolant circuit to circulate engine coolant through said fuel cell stack and a heat exchanger, and a coolant conduit carrying engine-heated coolant from said primary coolant circuit and routed to flow through or about said integrated water tank to melt any ice therein.

13. An electrochemical engine for a vehicle, as defined in claim 12, further comprising a coolant distribution valve in said primary coolant circuit operable to direct engine-heated coolant to said coolant conduit.

* * * * *